(12) United States Patent
Fanson et al.

(10) Patent No.: US 7,981,389 B2
(45) Date of Patent: *Jul. 19, 2011

(54) PROCESS USING MICROWAVE ENERGY AND A CATALYST TO CRACK HYDROCARBONS

(75) Inventors: Paul T Fanson, Brighton, MI (US); Hirohito Hirata, Shizuoka (JP); Masaya Ibe, Shizuoka (JP); Steven L Suib, Storrs, CT (US); Young Chan Son, Storrs, CT (US)

(73) Assignees: Toyota Motor Corporation, Toyota (JP); Toyota Motor Engineering & Manufacturing North America, Inc., Erlanger, KY (US); The University of Connecticut, Farmington, CT (US)

( * ) Notice: Subject to any disclaimer, the term of this patent is extended or adjusted under 35 U.S.C. 154(b) by 364 days.

This patent is subject to a terminal disclaimer.

(21) Appl. No.: 11/342,773

(22) Filed: Jan. 30, 2006

(65) Prior Publication Data

US 2006/0251557 A1 Nov. 9, 2006

Related U.S. Application Data

(60) Provisional application No. 60/648,537, filed on Jan. 31, 2005.

(51) Int. Cl.
*B01D 53/56* (2006.01)
*B01D 53/86* (2006.01)
*B01D 53/04* (2006.01)
*B01D 53/94* (2006.01)
*B01D 53/22* (2006.01)
*B01D 53/00* (2006.01)
*C01B 13/00* (2006.01)
*F01N 3/00* (2006.01)
*F01N 3/10* (2006.01)

(52) U.S. Cl. .............. 423/213.5; 423/239.1; 423/219; 423/230; 423/247; 423/248; 204/157.3; 60/295; 60/299

(58) Field of Classification Search .................. None
See application file for complete search history.

(56) References Cited

U.S. PATENT DOCUMENTS

| | | | | |
|---|---|---|---|---|
| 3,722,189 | A * | 3/1973 | Tourtellotte | 96/152 |
| 5,180,559 | A * | 1/1993 | Ma | 422/168 |
| 5,577,383 | A * | 11/1996 | Kuroda et al. | 60/284 |
| 5,998,328 | A * | 12/1999 | Dawes et al. | 502/182 |
| 6,093,378 | A * | 7/2000 | Deeba et al. | 423/213.5 |
| 6,335,305 | B1 * | 1/2002 | Suzuki et al. | 502/325 |
| 6,613,293 | B2 * | 9/2003 | Dornseiffer et al. | 422/174 |
| 6,782,875 | B2 | 8/2004 | Yoshimoto | |
| 7,468,171 | B2 * | 12/2008 | Fanson et al. | 423/213.2 |
| 2001/0009884 | A1 * | 7/2001 | Moskovitz et al. | 502/263 |

FOREIGN PATENT DOCUMENTS

EP 872911 A2 * 10/1998
JP 07124468 A * 5/1995

OTHER PUBLICATIONS

Loupy et al.; Microwaves in Organic Synthesis, Wiley-VCH, Weinheim, ISBN: 3-527-30514-9; 2002.*
Jap. Pub. No. 07124468A, Derwent Abstract 1995-211814.*

* cited by examiner

*Primary Examiner* — Melvin C Mayes
*Assistant Examiner* — Guinever S Gregorio

(57) ABSTRACT

A process for cracking hydrocarbons at atmospheric pressure includes the following steps: providing a catalyst, passing a gaseous hydrocarbon over the catalyst and exposing the catalyst to microwave energy. The hydrocarbons are broken down into lower Carbon number molecules.

10 Claims, 2 Drawing Sheets

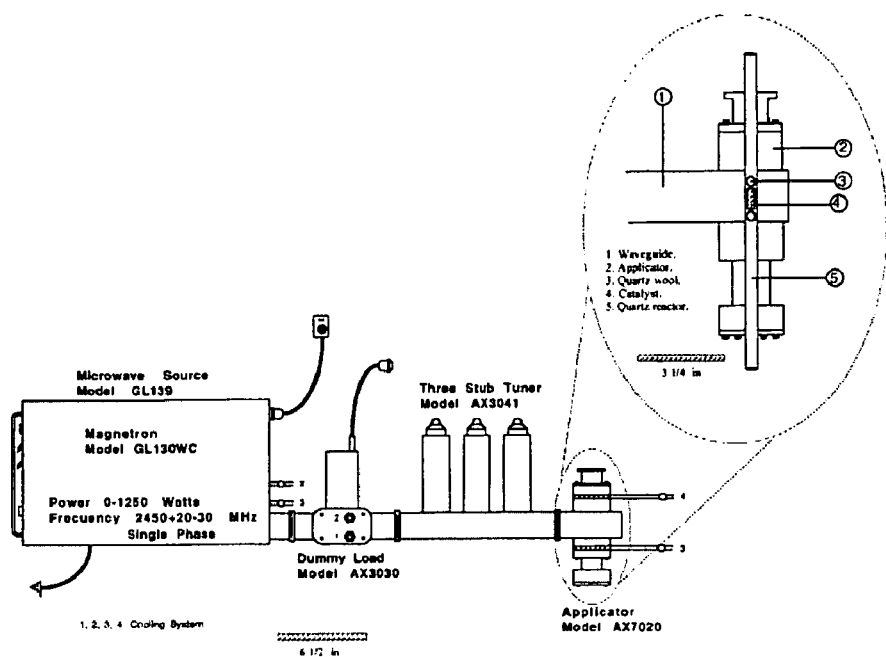
Figure 1
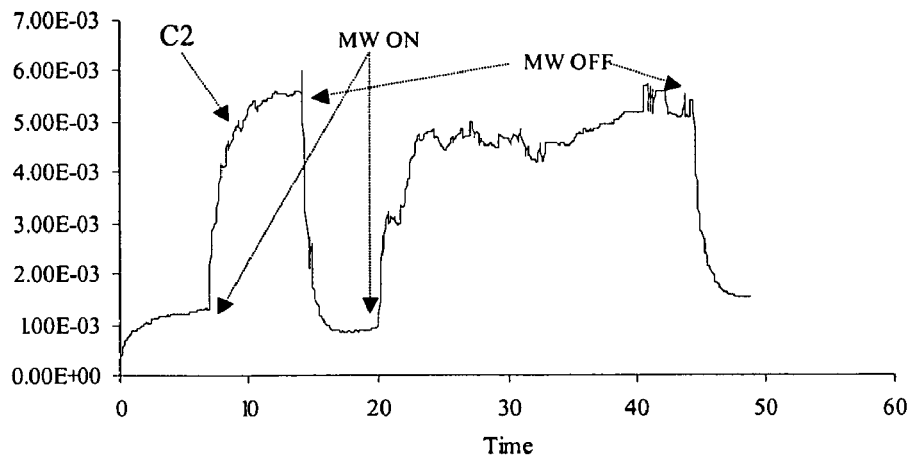
Figure 2 – Decomposition of octane ($C_8H_{18}$) over a Pt / $Al_2O_3$ catalyst using microwave energy.

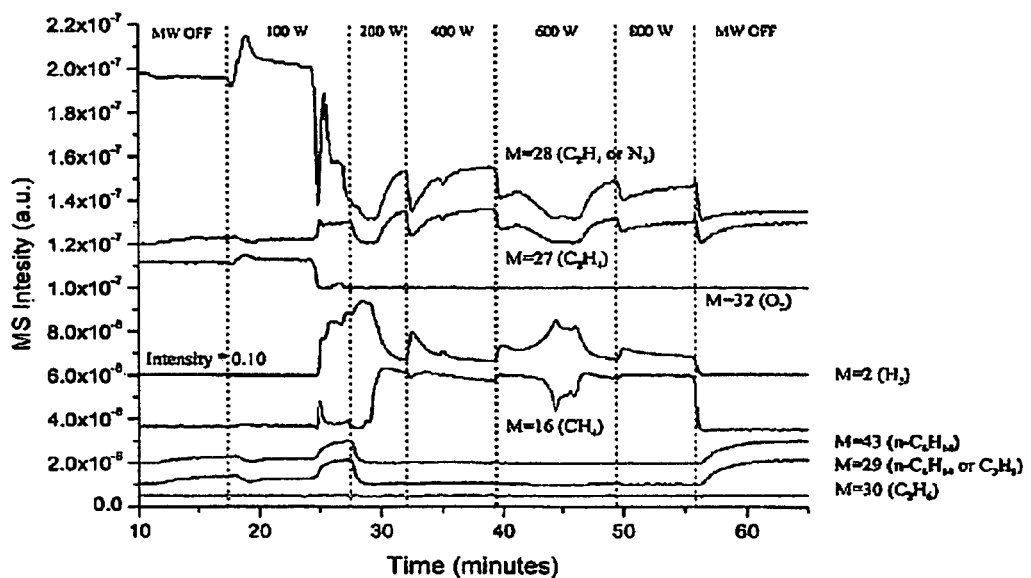
Figure 3 Hexane cracking experiment using approx 20% n-hexane in He at 100-800W of MW Power over Activated Carbon
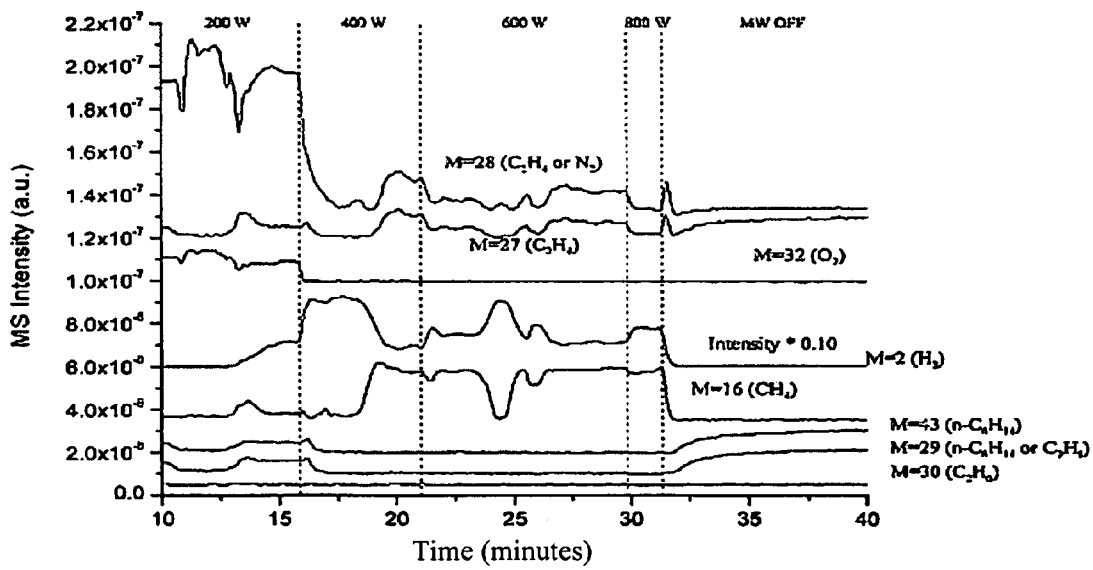
Figure 4 Hexane cracking experiment using approx 20% n-hexane +3% H2O in He at 100-800W of MW Power over Activated Carbon

PROCESS USING MICROWAVE ENERGY AND A CATALYST TO CRACK HYDROCARBONS

RELATED APPLICATION

This application claims priority of U.S. Provisional Patent Application Ser. No. 60/648,537 filed Jan. 31, 2005, which is incorporated herein by reference.

FIELD OF THE INVENTION

The invention relates to a process for cracking hydrocarbons and more particularly to a process for cracking hydrocarbons using microwave energy.

BACKGROUND OF THE INVENTION

Exhaust from combustion engines creates a variety of environmental pollutants that must be removed from the exhaust stream in order to protect both public health and the environment. For automobiles, the 3-way catalyst has been used for decades to convert these chemicals, primarily carbon dioxide, nitrogen oxides, and unburned hydrocarbons into benign products, such as carbons dioxide, nitrogen, and water. However, as environmental regulations become more stringent, a higher loading of precious metals are required to purify the exhaust gases to the necessary levels.

One way to achieve higher conversion of pollutants and lower consumption of precious metals is to increase the efficiency of the catalyst. In the case of gasoline engines with 3-way catalysts, the efficiency of the catalytic converter could be enhanced if long chain hydrocarbons in the exhaust stream were broken down or cracked into smaller parafm or olefin molecules. In the case of some types of fuels (such as diesel fuel), the reduction of NOx is enhanced if fuel is added directly to the exhaust stream. Similar to the gasoline-based catalytic converter, the efficiency of the catalyst would be improved if the hydrocarbon molecules were broken down. This increase in efficiency would result in an overall decrease in emissions and precious metal consumption by the exhaust catalysts.

Catalytic cracking of crude oil using zeolite catalysts has been done in the petroleum industry for many years. In addition, thermal cracking of hydrocarbons is possible at high temperatures and pressures. The high pressure conditions needed for both of these reactions is not suitable for automotive applications.

There is therefore a need in the art for an improved process for the break down or cracking of hydrocarbons in an automotive application.

SUMMARY OF THE INVENTION

A process for cracking hydrocarbons at atmospheric pressure includes the following steps: providing a catalyst, passing a gaseous hydrocarbon over the catalyst and exposing the catalyst to microwave energy. The hydrocarbons are broken down into lower Carbon number molecules.

BRIEF DESCRIPTION OF THE DRAWINGS

FIG. 1 is a figure of an experimental microwave apparatus used in experiments using the process of the present invention;

FIG. 2 is a figure of the relative partial pressure of Octane plotted against time for different temperatures over a Platinum/Aluminum Oxide catalyst;

FIG. 3 is a plot of the MS intensity for various molecular weights against time for 20% n-hexane in He at 100-800 W of microwave power;

FIG. 4 is a plot of the MS intensity for various molecular weights against time for 20% n-hexane+3% water in He at 100-800 W of microwave power.

DETAILED DESCRIPTION OF THE PREFERRED EMBODIMENTS

There is described a process for cracking hydrocarbons. The process includes providing a catalyst and then passing a gaseous hydrocarbon over the catalyst. The catalyst is then exposed to microwave energy. The gaseous hydrocarbon is broken down into lower carbon number molecules.

For the purposes of describing the process of the present invention a 3-way catalyst having a precious metal dispersed in a metal oxide support material will be discussed. The precious metal may be an element such as Platinum, Palladium, Rhodium, Silver and Gold. The metal oxide support material may be a composition or compound such as Aluminum Oxide, Cesium Oxide, Titanium Oxide, Zirconium Oxide and Silicon Oxide. Additionally, the catalyst may be activated carbon or another suitable material. While the description focuses on a 3-way catalyst and activated carbon for the purposes of describing the process of the present invention, it is to be realized that the process of the present invention may also be utilized on other catalysts including: a nitrogen storage catalyst having a precious metal and an alkaline metal, such as Sodium, Magnesium, Potassium, Calcium, Rubidium, Strontium, Cesium, and Barium dispersed in a metal oxide support material.

The cracking of Octane over a Platinum reduction-oxidation component disposed on an Aluminum Oxide support material will be described, as well as the cracking of hexane over an activated carbon catalyst in conjunction with the process of the present invention. In one aspect of the present invention hydrocarbons greater than C4 in carbon number may be cracked by the process of the invention. For the cracking of hexane the cracking can be described by the following equations:

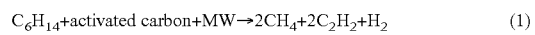

$$C_6H_{14} + \text{activated carbon} + MW \rightarrow 2CH_4 + 2C_2H_2 + H_2 \quad (1)$$

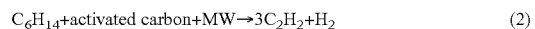

$$C_6H_{14} + \text{activated carbon} + MW \rightarrow 3C_2H_2 + H_2 \quad (2)$$

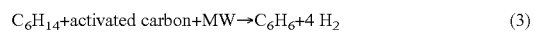

$$C_6H_{14} + \text{activated carbon} + MW \rightarrow C_6H_6 + 4H_2 \quad (3)$$

As can be seen from the above reactions, the hexane may be broken down to various components with the first reaction being the most common reaction and the third reaction being the least common reaction.

The process of the present invention also includes the step of exposing the catalyst to microwave energy. The microwave energy may have a power of from 0.001 to 5000 Watts. Additionally, the microwave energy may have a frequency of from 2.0 to 4.0 Gigahertz. Microwave (MW) heating is fundamentally different from conventional heating. As opposed to the generation of heat by external sources as in conventional heating, the generation of heat in microwaves is produced by the interaction between molecules in the heated material and the electromagnetic field created in the MW oven. With microwaves, energy can be delivered to reacting molecules at a much greater rate if compared to conventional heating, which makes a more efficient way to heat, since microwaves allow faster and more uniform heating.

EXAMPLES

The catalyst described in the First example is Platinum reduction-oxidation component disposed on an Aluminum Oxide support material. About 500 mg of the catalyst was packed between quartz wool plugs in a quartz tubular reactor.

The experiments were performed using an ASTEX model GL139 microwave reactor, indicated in FIG. 1. The power output of the oven was regulated using a Micristar controller. Microwaves were generated at 2.45 GHz with a maximum variable power supply of 1.3 kW. Cracking experiments were carried out at atmospheric pressure in a continuous flow fixed-bed tubular quartz reactor with Teflon fittings.

For octane cracking experiments, 500 mg of the 5 wt % $Pt/Al_2O_3$ catalyst was used. The Octane was fed to the quartz reactor at a rate of 30 mL/min using a helium carrier gas. The cracked hydrocarbon compounds were monitored using an on-line MKS-UTI PPT quadrupole mass spectrometer (MS).

Experiments carried out using Octane at a power level of 500 W, indicate the cracking of the octane as the catalyst and Hydrocarbon are exposed to microwaves, as indicated by the peaks of the C2 species in FIG. 2 when the microwaves are turned on. These peaks confirm the formation of C2 species from the Octane.

The catalyst described in a second example is activated carbon. The experiments were again performed on the same apparatus described in example one, with hexane as the hydrocarbon feed. In the experiment 60 mg of activated carbon was used. The hexane was fed to the reactor using 10 ml/min of He passed through hexane and/or water bubblers for the various inlet streams of the experiment. The flow through the bubblers resulted in an approximately 20 mole % hexane in the inlet stream and approximately 3 mole % water in the inlet stream based on the vapor pressure of each gas at room temperature.

Experiments carried out using hexane at varying power levels from 100-800 W, indicate the cracking of the hexane as the catalyst and Hydrocarbon are exposed to microwaves. Referring to FIG. 3 it can be seen that the peak of hexane drops to almost zero after an initial lag time likely needed to clean the surface of the catalyst. After the lag time the concentration drops almost to zero indicated a conversion or cracking of the hexane into smaller molecules. Based on the peaks indicated in FIG. 3, the hexane is converted to $H_2$, $CH_4$, $C_2H_4$, and $C_2H_2$, as indicated by the peaks of the Figure when the microwaves are turned on. These peaks confirm the formation of C1 and C2 species from the hexane.

Since microwaves interact very efficiently with water, some experiments were carried out in the presence of water. To study the effect of water process the input of water to the system was fed through the bubbler as described above. FIG. 4 details the results of the experiment at various power levels. The profile is similar to that of FIG. 3, where a high conversion of hexane occurs at power levels of from 200 to 800 W. The water does not seem to have a great influence on the cracking reaction.

While the above examples provide a description of the process of the present invention, they should not be read as limiting the process of the present invention. Specifically, various power levels and catalysts may be utilized by the present invention in an effort to improve the cracking of the hydrocarbons. Additionally, the cracked hydrocarbons formed from the process of the present invention may be fed to a catalytic converter of an automobile, thereby improving the overall efficiency of the converter due to the smaller hydrocarbon molecules being fed to it. The hydrocarbons cracked by the process of the present invention may include automotive fuels and automotive exhaust gases including straight chain and branched alkanes, alkanes, alkynes, aromatics, and oxygenated hydrocarbons such as alcohols, ketones, and carboxylic acids. Additionally, the hydrocarbons may include combustion exhaust gases such as nitrogen, water, carbon monoxide, carbon dioxide, oxygen, nitrogen oxide, nitrogen dioxide, and hydrogen.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A process for cracking a gaseous hydrocarbon in an automotive exhaust at atmospheric pressure comprising the steps of:
   a) providing a three way catalyst having a precious metal dispersed in a metal oxide support material in an exhaust system of a vehicle;
   b) passing a gaseous hydrocarbon over the three way catalyst;
   c) exposing the three way catalyst in the presence of the gaseous hydrocarbon to microwave energy;
   wherein the gaseous hydrocarbon reacts with the three way catalyst and is broken down into lower carbon number molecules; and
   feeding the broken down lower carbon molecules to a catalytic converter, said catalytic converter having a lower precious metal consumption in comparison to another catalytic converter in which higher long chain hydrocarbons are fed.

2. The process of claim 1 wherein the hydrocarbon has a carbon number greater than 4.

3. The process of claim 1 further including the step of exposing the catalyst to water.

4. The process of claim 1 wherein the microwave energy has a power of from 0.001 to 5000 Watts.

5. The process of claim 1 wherein the microwave energy has a frequency of from 2.0 to 4.0 Gigahertz.

6. The process of claim 1 including a base metal selected from the group consisting of: Iron, Copper, Nickel, and Manganese.

7. The process of claim 1 wherein the precious metal is selected from the group consisting of: Platinum, Palladium, Rhodium, Silver and Gold.

8. The process of claim 1 wherein the metal oxide support material is selected from the group consisting of: Aluminum Oxide, Cesium Oxide, Titanium Oxide, Zirconium Oxide and Silicon Oxide.

9. The process of claim 1 wherein the gaseous hydrocarbon is a combustion exhaust gas.

10. The process of claim 9 wherein the combustion exhaust gas includes components selected from the group consisting of: nitrogen, water, carbon monoxide, carbon dioxide, oxygen, nitrogen oxide, nitrogen dioxide, and hydrogen.

* * * * *

UNITED STATES PATENT AND TRADEMARK OFFICE
CERTIFICATE OF CORRECTION

PATENT NO. : 7,981,389 B2
APPLICATION NO. : 11/342773
DATED : July 19, 2011
INVENTOR(S) : Paul T. Fanson et al.

Page 1 of 1

It is certified that error appears in the above-identified patent and that said Letters Patent is hereby corrected as shown below:

Column 1, Line 26 "carbons" should read --carbon--.

Column 2, Line 48 "$3C_2H_2+H_2$" should read --$3C_2H_2+4H_2$ (2)--.

Signed and Sealed this
Thirteenth Day of March, 2012

David J. Kappos
*Director of the United States Patent and Trademark Office*